(12) United States Patent
Utsumi

(10) Patent No.: US 8,619,311 B2
(45) Date of Patent: Dec. 31, 2013

(54) IMAGE READING APPARATUS AND A METHOD FOR CONTROLLING THE SAME TO PERFORM PRINT PROCESSING BASED ON THE STORED IMAGE DATA

(75) Inventor: Yuichi Utsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 12/815,293

(22) Filed: Jun. 14, 2010

(65) Prior Publication Data

US 2010/0321735 A1    Dec. 23, 2010

(30) Foreign Application Priority Data

Jun. 17, 2009 (JP) .................................. 2009-144618

(51) Int. Cl.
| | | |
|---|---|---|
| G06F 3/12 | (2006.01) | |
| G06K 15/00 | (2006.01) | |
| H04N 1/04 | (2006.01) | |
| H04N 1/46 | (2006.01) | |
| G03F 3/08 | (2006.01) | |
| G03B 27/80 | (2006.01) | |
| G03B 27/10 | (2006.01) | |
| G03B 27/04 | (2006.01) | |
| G03B 27/02 | (2006.01) | |

(52) U.S. Cl.
USPC ........... 358/1.16; 358/1.1; 358/498; 358/505; 358/523; 355/81; 355/84; 355/128; 355/132

(58) Field of Classification Search
USPC .............. 358/1.16, 404, 444, 468, 450, 1.18, 358/474, 408, 400, 1.2, 1.15, 443, 464, 523, 358/525, 498, 448, 432, 401, 505, 496; 399/83, 82, 85, 367, 403, 405, 379, 399/381, 383, 392, 393, 361, 363, 38, 17, 399/11; 355/407, 19, 78, 81, 84, 97, 99, 355/112, 120, 128, 132
See application file for complete search history.

(56) References Cited

U.S. PATENT DOCUMENTS

| | | | | |
|---|---|---|---|---|
| 5,798,843 A | * | 8/1998 | Yamamoto et al. | ........... 358/404 |
| 5,877,864 A | * | 3/1999 | Sumida et al. | ............... 358/1.16 |
| 5,987,227 A | * | 11/1999 | Endo et al. | .................... 358/1.13 |
| 6,788,830 B1 | * | 9/2004 | Morikawa | ..................... 382/305 |
| 2005/0140991 A1 | * | 6/2005 | Ogiwara et al. | ............... 358/1.2 |

FOREIGN PATENT DOCUMENTS

| | | |
|---|---|---|
| JP | 8-084229 A | 3/1996 |
| JP | 09-083760 A | 3/1997 |
| JP | 11-088566 A | 3/1999 |

\* cited by examiner

*Primary Examiner* — Ngon Nguyen

(74) *Attorney, Agent, or Firm* — Canon U.S.A., Inc. IP Division

(57) ABSTRACT

An apparatus continues, before a number of pages where image data started to be input reaches N pages, inputting of the image data until an amount of the image data stored in a storage unit reaches a first amount, and thereafter, continue the inputting of the image data until the amount of the stored image data reaches a second amount, which is smaller than the first amount.

15 Claims, 17 Drawing Sheets

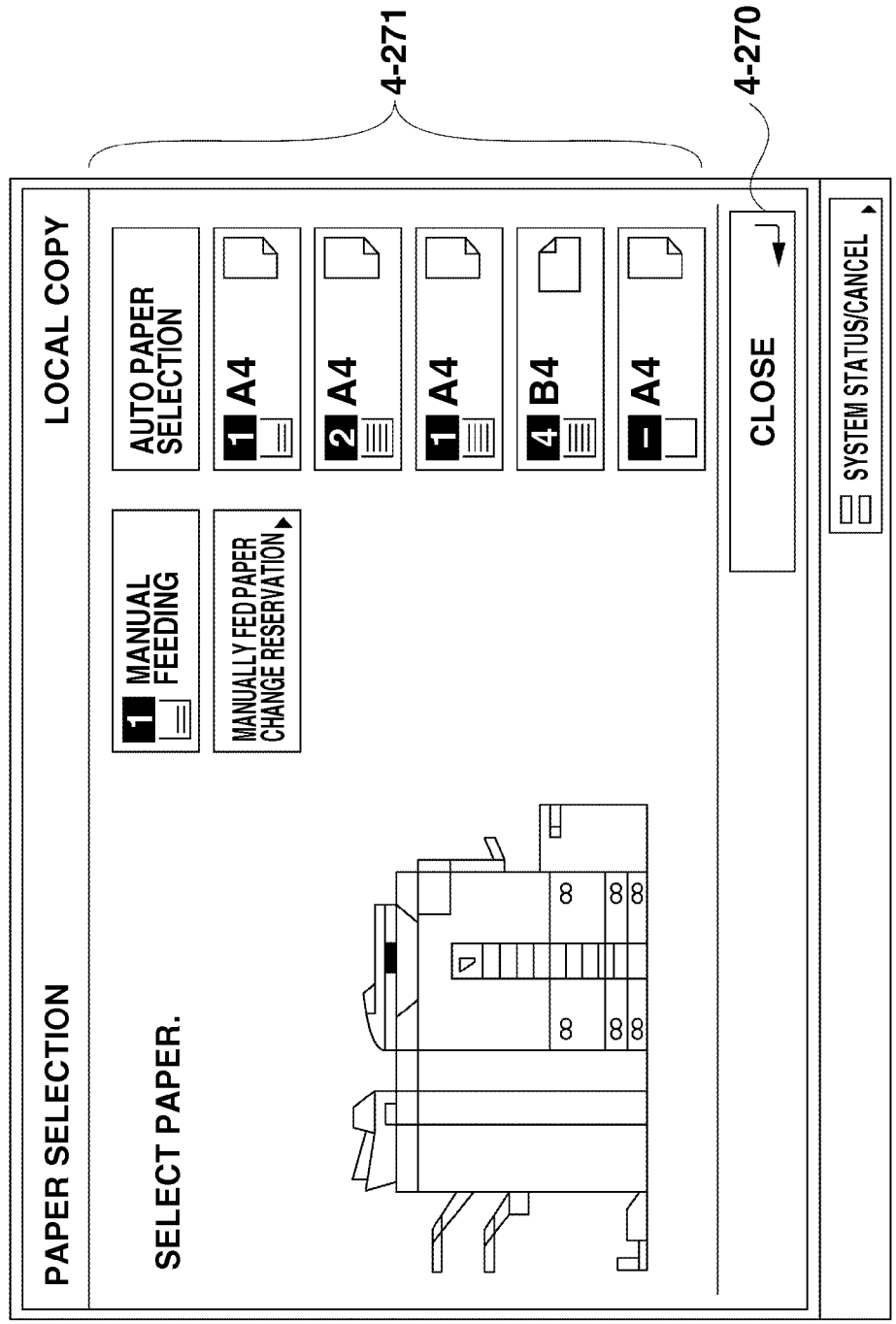

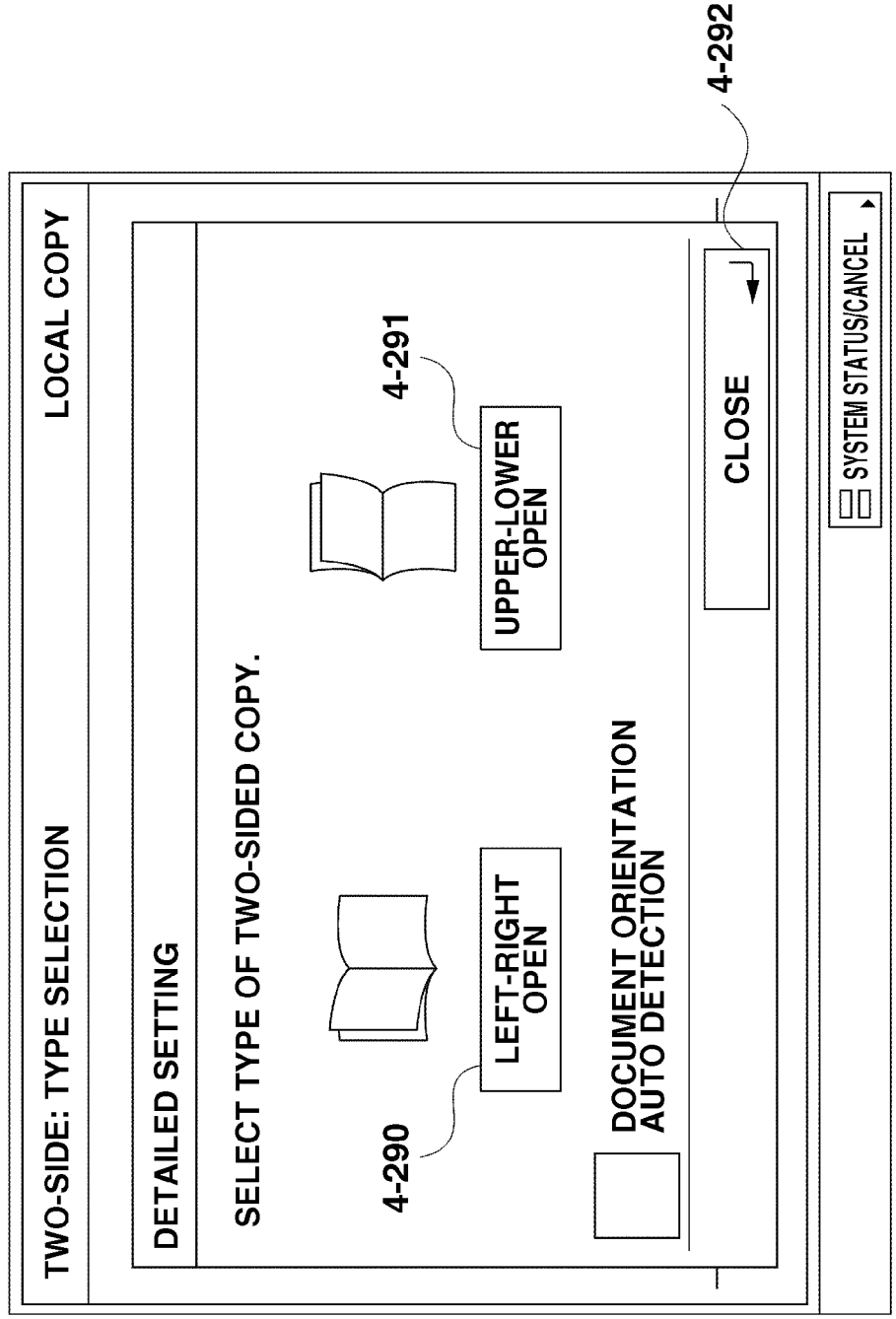

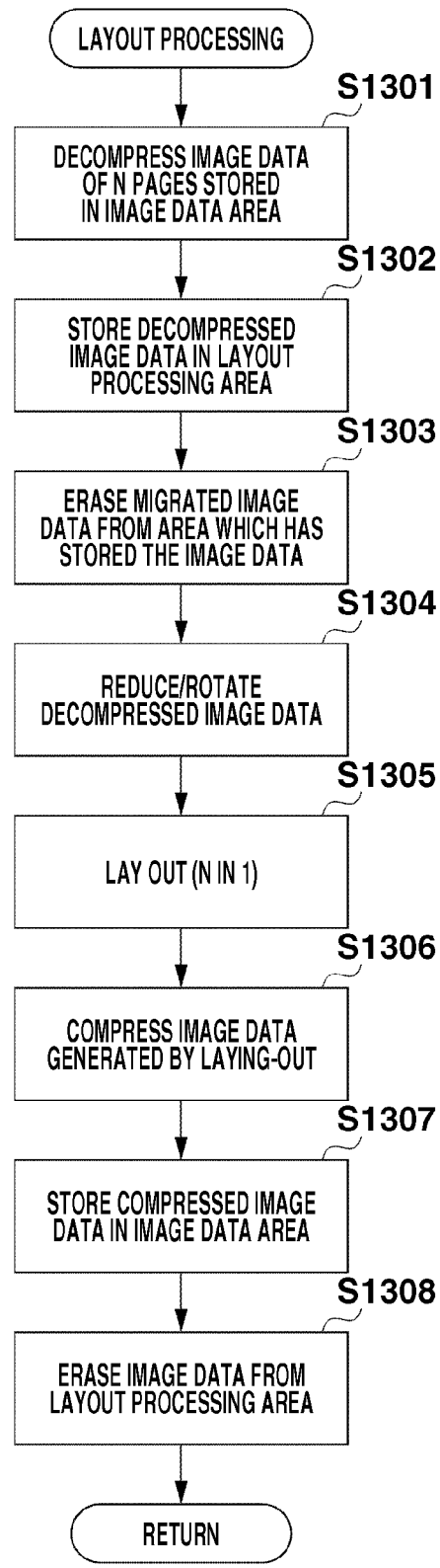

IMAGE READING APPARATUS AND A METHOD FOR CONTROLLING THE SAME TO PERFORM PRINT PROCESSING BASED ON THE STORED IMAGE DATA

BACKGROUND OF THE INVENTION

1. Field of the Invention

The present invention relates to an image reading apparatus and a method for controlling the same.

2. Description of the Related Art

There is conventionally known an image reading apparatus, which acquires image data by reading a document and performing print processing based on the acquired image data. In the image reading apparatus, layout processing or sort processing is known as a process for storing image data of a plurality of pages in a storage unit such as a memory and performing print processing based on the image data of the plurality of pages.

The layout processing generates, in order to print image data of N pages in one sheet, a print product by performing layout processing for the image data of the N pages. For example, there is 2-in-1 processing for reducing image data of two pages to generate image data of one page and printing the image data in one sheet.

The sort processing stores the image data of the N pages in the storage unit such as a memory, and then generates a plurality of copies of a print product with the N pages set as one copy by reading the image data of the N pages a plurality of times. For example, there is processing for printing five copies of a print product with image data of ten pages set as one copy.

Performing the layout processing and the sort processing uses a memory for storing the image data of the N pages. However, there is a limit on a memory capacity. When an amount of the stored image data reaches the memory capacity to cause a memory full state before the storage of the image data of the N pages in the memory is completed, input processing of the image data becomes an error.

Concerning a method for dealing with a memory full state, Japanese Patent Laid-Open No. 8-84229 discusses a method for decompressing, when a memory full state occurs during inputting of image data, the compressed image data and recompressing the image data by lower resolution.

However, in the technology discussed in Japanese Patent Application Laid-Open No. 8-84229, there may be an issue of a reduction in image quality of the image data caused by the recompression performed with the lower resolution.

Even when the input processing of the image data is prevented from becoming an error due to the memory full state while avoiding a reduction in image quality, an issue may occur. For example, a method may be employed which stops the inputting of the image data when an amount of the input image data reaches a capacity (threshold capacity), which is smaller than a maximum capacity of a storage area by a predetermined amount for storing the image data. In this case, if the image data stored in the memory is erased with a progress of the print processing, the inputting of the image data can be resumed according to a drop of the amount of the input image data below the threshold capacity.

However, in the case of the layout processing or the sort processing, if the amount of the input image data reaches the threshold capacity before the image data of the N pages is stored in the memory, an error occurs in a state where no print processing is performed.

SUMMARY OF THE INVENTION

According to an aspect of the present invention, an apparatus includes an input unit to input image data on a page-by-page basis, a storage unit to store the image data, a printing unit to perform print processing for a sheet based on the stored image data, a setting unit to set a processing mode to start, after image data of N pages input by the input unit is stored in the storage unit, the print processing based on the image data of the N pages, and a control unit to control, when the processing is set, the input unit so as to continue, before a number of pages where image data started to be input reaches the, inputting of the image data until an amount of the stored image data reaches a first amount, and thereafter, continue the inputting of the image data until the amount of the stored image data reaches a first amount, and thereafter, continues the inputting of the image data until the amount of the stored image data reaches a second amount, which is smaller than the first amount.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A to 5D each illustrate a screen displayed on the operation unit.

FIG. 13 is a flowchart illustrating layout processing.

DESCRIPTION OF THE EMBODIMENTS

Various exemplary embodiments, features, and aspects of the invention will be described in detail below with reference to the drawings.

Figure 1:
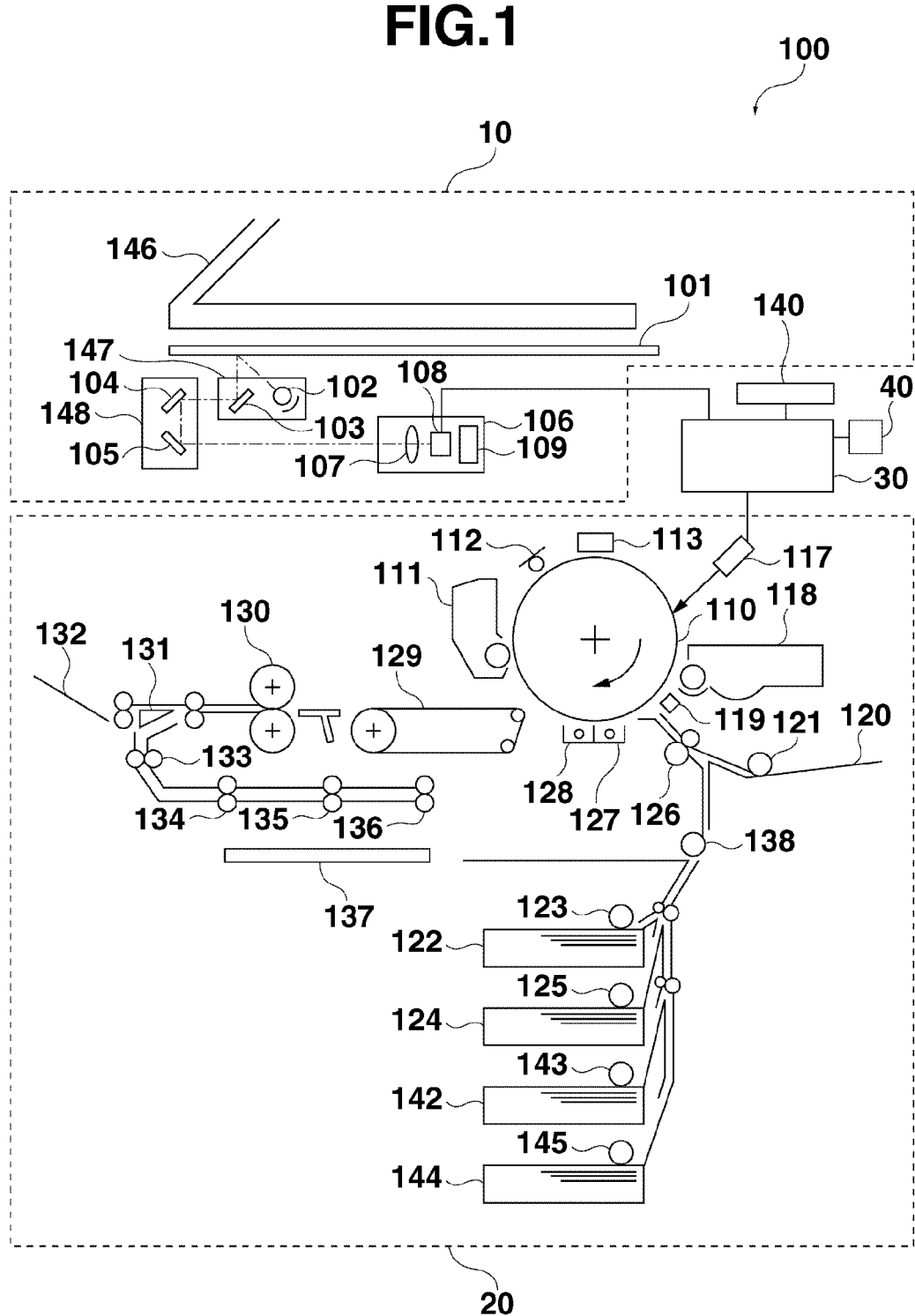
FIG. 1 illustrates a configuration of an image reading apparatus.

FIG. 1 illustrates a configuration of an image reading apparatus 100.

The image reading apparatus 100 in FIG. 1 includes a scanner unit 10, a printer unit 20, a controller unit 30, a power supply device 40 for generating a DC power supply from an AC power supply, and an operation unit 140 serving as an interface for inputting user's operation.

The scanner unit 10 includes a document positioning glass 101 for positioning a document, and an Auto Document Feeder (ADF) 146 for sequentially feeding documents to a predetermined position of the document positioning glass 101. The scanner unit 10 includes a document illumination lamp 102, a scanning mirror 103, and a scanning unit 147 disposed below the document positioning glass 101.

The scanner unit 10 includes a scanning unit 148 having scanning mirrors 104 and 105 for reflecting reflected light from the scanning mirror 103 to a CCD unit 106. The scanner unit 10 includes an imaging lens 107 for receiving reflected light from the scanning mirror 105 to form an image, an image sensor 108 for converting the formed image into a digital image signal, and the CCD unit 106 having a CCD driver 109 for driving the image sensor 108.

The controller unit 30 performs processing for generating image data based on an image signal output from the image sensor 108, and controls the entire apparatus. Details will be described below referring to FIG. 3.

The printer unit 20 includes a photosensitive drum 110, and an exposure unit 117 for exposing the photosensitive drum 110 to form an electrostatic latent image based on the image data generated by the controller unit 30. The printer unit 20 includes a development unit 118 for housing toner, which is a black developer, and developing the electrostatic latent image on the photosensitive drum 110 by the toner. The printer unit 20 includes a pre-transfer charger 119 for applying a high voltage to a toner image developed on the photosensitive drum 110 before transfer.

The printer unit 20 includes a manual paper feeding unit 120, and sheet feeding units 122, 124, 142, and 144 for storing sheets. The printer unit 20 includes feeding rollers 121, 123, 125, 143, and 145 for feeding a sheet on the manual paper feeding unit 120 and sheets stored in the sheet feeding units. The printer unit 20 includes a registration roller 126 for feeding sheets fed from the sheet feeding rollers 121, 123, 125, 143, and 145 to the photosensitive drum 110.

The feeding rollers 121, 123, 125, 143, and 145 stop the sheet on the manual paper feeding unit 120 and the sheets stored in the paper feeding units temporarily at a position of the registration roller 126. Then, the sheets are fed so that the toner image developed on the photosensitive drum 110 is transferred.

The printer unit 20 includes a transfer charger 127 for transferring the toner image developed on the photosensitive drum 110 to a fed sheet, and a separation charger 128 for separating, from the photosensitive drum 110, the sheet to which the toner image has been transferred from the photosensitive drum 110. The printer unit 20 includes a conveyance belt 129 for conveying the separated sheet to a fixing device 130, and a cleaner 11 for recovering toner left on the photosensitive drum 110 without being transferred. The printer unit 20 includes a pre-exposure lamp 112 for electrically discharging the photosensitive drum, and a primary charger 113 for uniformly charging the photosensitive drum 110.

The printer unit 20 includes the fixing device 130 for fixing the toner image on the sheet to which the toner image has been transferred, and a sorter 132 for receiving the sheet on which the toner image has been fixed via a flapper 131. The printer unit 20 includes an intermediate tray 137 for receiving the sheet on which the toner image has been fixed via the flapper 131 and feeding rollers 133 to 136. The printer unit 20 includes a refeeding roller 138 for feeding the sheet stored in the intermediate tray 137 to the photosensitive drum 110 again.

The flapper 131 is configured to switch a feeding destination of the sheet on which the toner image has been fixed between the sorter 132 and the intermediate tray 137. The feeding rollers 133 to 136 are configured to nonreverse (multiplex) or reverse (two-sided) the sheet on which the toner image has been fixed.

Figure 2:
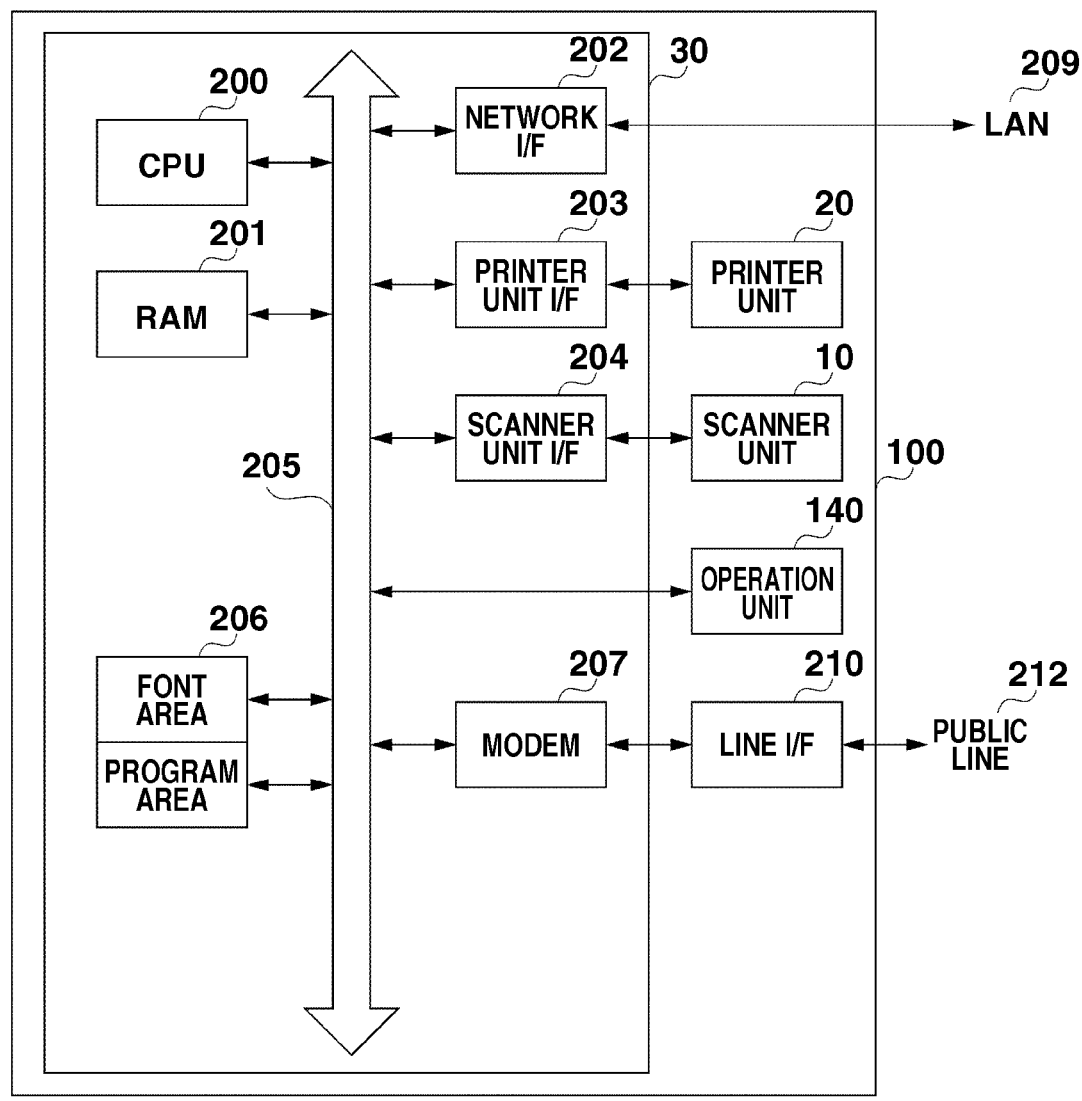
FIG. 2 is a block diagram illustrating a control configuration of the image reading apparatus.

FIG. 2 is a block diagram illustrating a control configuration of the image reading apparatus 100.

As illustrated in FIG. 2, the image reading apparatus 100 includes the scanner unit 10, the printer unit 20, the operation unit 140, aline I/F 210, and the controller unit 30.

The controller unit 30 includes a central processing unit (CPU) 200, a random access memory (RAM) 201, a read only member (ROM) 206, a network I/F 202, a printer unit I/F 203, a scanner unit I/F 204, and a modulator-demodulator (MODEM) 207. The units of the controller unit 30 are interconnected via a system bus 205, and each unit is controlled based on commands transmitted from the controller unit via the system bus 205.

The CPU 200 controls each unit of the controller unit 30 by expanding a program stored in a program area of the ROM 206 to execute it.

The system bus 205 also functions as a data bus for storing image data input from the scanner unit 10 via the scanner unit I/F 204 in the RAM 201 (storage unit). The system bus 205 functions as a data bus for transferring the image data stored in the RAM 201 to the printer unit 20 via the printer I/F 203.

The network I/F 202 is an interface for transmitting/receiving data with an external apparatus (not illustrated) connected via a LAN 209. The MODEM 207 is for transmitting/receiving data with a facsimile apparatus connected from the line I/F 210 via a public line 212.

The CPU 200 performs, by using font data stored in a font area of the ROM 206, processing for generating a character image to be displayed by the operation unit 140 or processing for an instruction input given from a user of the image reading apparatus 100 via the operation unit 140. The CPU 200 has a function of compressing image data input via the scanner unit I/F 204 before the image data is stored in the RAM 201, and storing the compressed image data in the RAM 201 (compression unit).

The CPU 200 has a function of decompressing the compressed image data stored in the RAM 201, and transferring the decompressed image data from the RAM 201 to the printer unit 20 (decompression unit).

Next, referring to FIG. 4, a configuration of the operation unit 140 provided in the image reading apparatus 100 will be described.

The operation unit 140 includes a hard key group 4-240 having various hard keys 4-241 to 4-246. The operation unit 140 includes a liquid crystal display unit 4-250 composed of a dot matrix, which includes a liquid crystal display apparatus. The liquid crystal display unit 4-250 includes a touch panel on its surface. The operation unit 140 detects a key input based on pressing of the hard key or the touch panel by an operator of the image reading apparatus 100, and transmits a signal corresponding to the key input to the CPU 200. The CPU 200 controls the image reading apparatus 100 based on a program stored in the ROM 206, and executes an operation according to the received signal.

The key 4-243 is a power supply key for turning ON/OFF the power. The key 4-244 is a power-saving key for setting a power-saving mode or releasing the power-saving mode. The start key 4-241 is a key for allowing the operator to instruct starting various processes such as an instruction to start a reading operation of an image in a document by the scanner unit 10. The stop key 4-242 is a key for allowing the operator to instruct stopping the operation of the image reading apparatus 100.

The key group 4-245 has ten keys of 0 to 9 for inputting a number of copies or zoom magnification, and a clear key for clearing the input. The number of copies input by the key group 4-245 is displayed on the liquid crystal display unit 4-253. The reset key 4-246 is a key for returning setting conditions set by the operator via the liquid crystal display unit 4-250 or the hard key group 4-240 to an initial state.

Figure 5B:
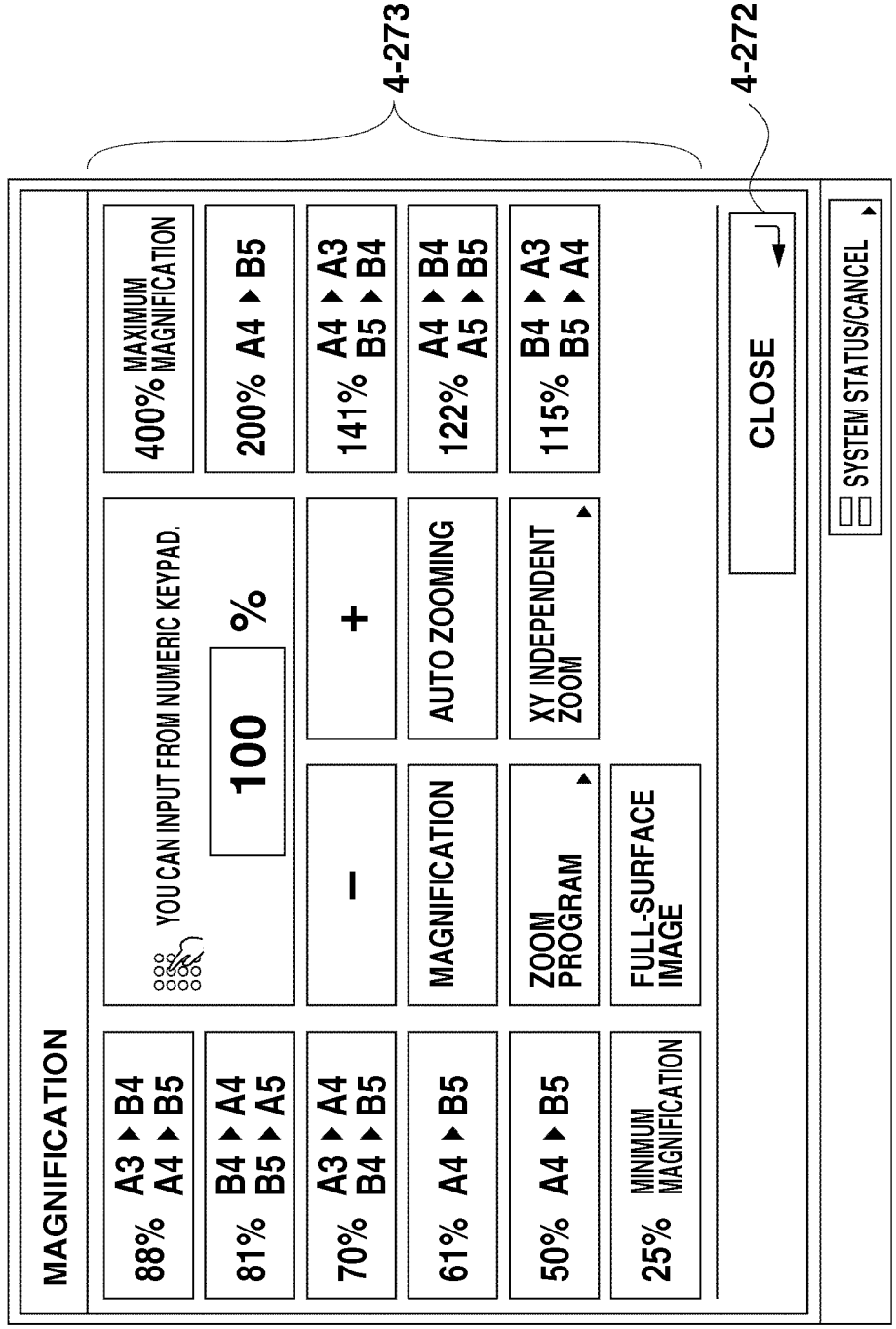

The liquid crystal display unit 4-250 displays an operation state of the image reading apparatus 100 based on an instruction from the CPU 200. The liquid crystal display unit 4-250 also displays the touch key. In the liquid crystal display unit 4-250, a key 4-252 is used for selecting a cassette where sheets (paper) used for copy processing of the image reading apparatus 100 are stacked. The CPU 200 controls, when the operator presses the key 4-252, the operation unit 204 to display a paper selection screen illustrated in FIG. 5A on the liquid crystal display unit 4-250.

A sheet feeding unit (one of the sheet feeding units 122, 124, 142, and 144) used for print processing is selected by a key group 4-271 of the paper selection screen illustrated in FIG. 5A. The CPU 200 closes, when the operator presses a close key 4-270, the screen to return to the screen illustrated in FIG. 4, and displays the selected sheet feeing unit on a display unit 4-251.

Figure 4:
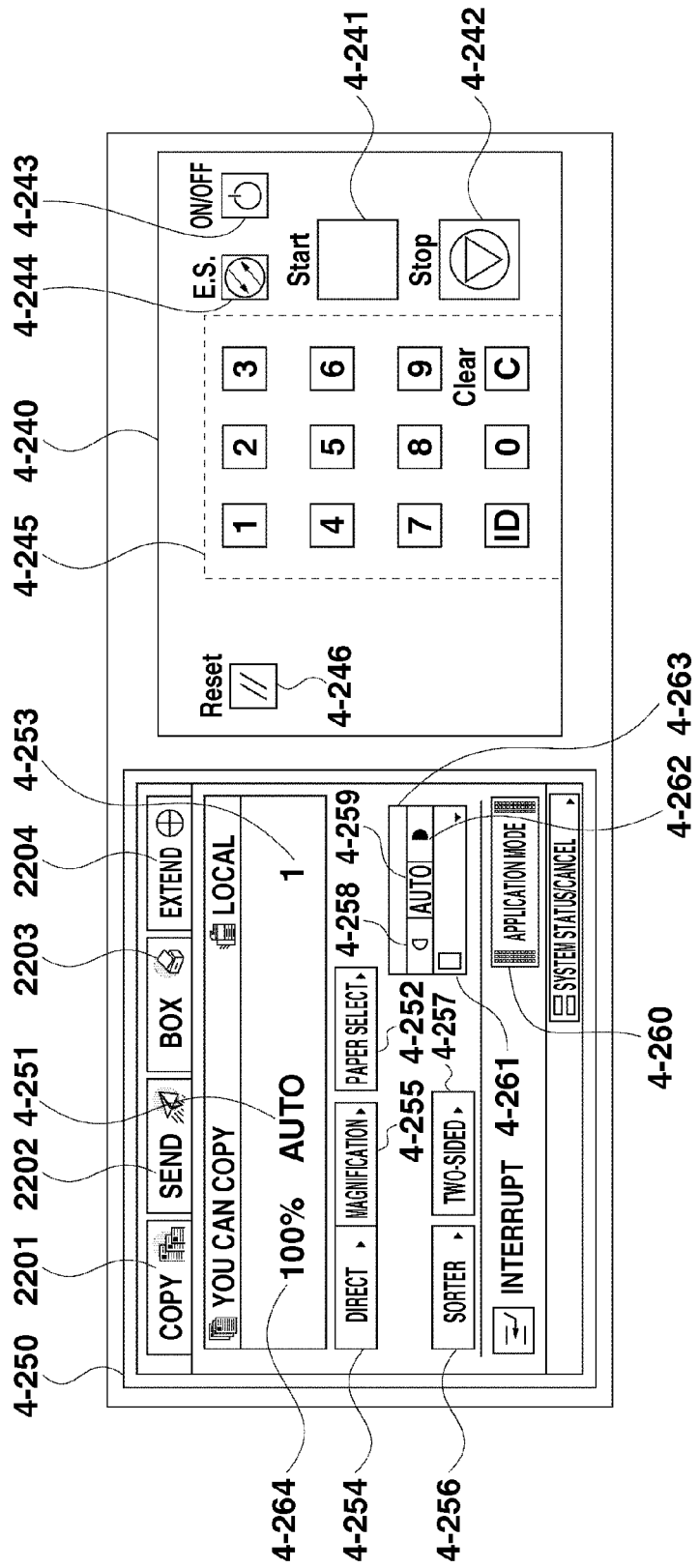
FIG. 4 illustrates a configuration of an operation unit.

Keys 4-258 and 4-262 of FIG. 4 are used for adjusting densities. The CPU 205 displays densities adjusted by these keys on the display unit 4-263. A key 4-259 is used for turning ON/OFF an auto density adjustment function. A key 4-261 is used for setting a photographic mode or a text mode.

A key 4-254 and a key 4-255 are used for setting direct, and reduction/expansion. When the key 4-255 is pressed, the CPU 200 displays a magnification screen illustrated in FIG. 5B on the liquid crystal display unit 4-250 to allow detailed setting of expansion/reduction. When a magnification is selected by a key group 4-273 of the magnification screen illustrated in FIG. 5B, and the operator presses a close key 4-272, the CPU 200 closes the screen to return to the screen illustrated in FIG. 4. The CPU 200 displays a set magnification on the display unit 4-251.

A key 4-257 is a two-sided key. When the key 4-257 is pressed, the CPU 205 displays a two-sided print setting screen illustrated in FIG. 5C on the liquid crystal display unit 4-250. Hereinafter, referring to FIG. 5C, setting of two-sided printing will be described.

Figure 5C:
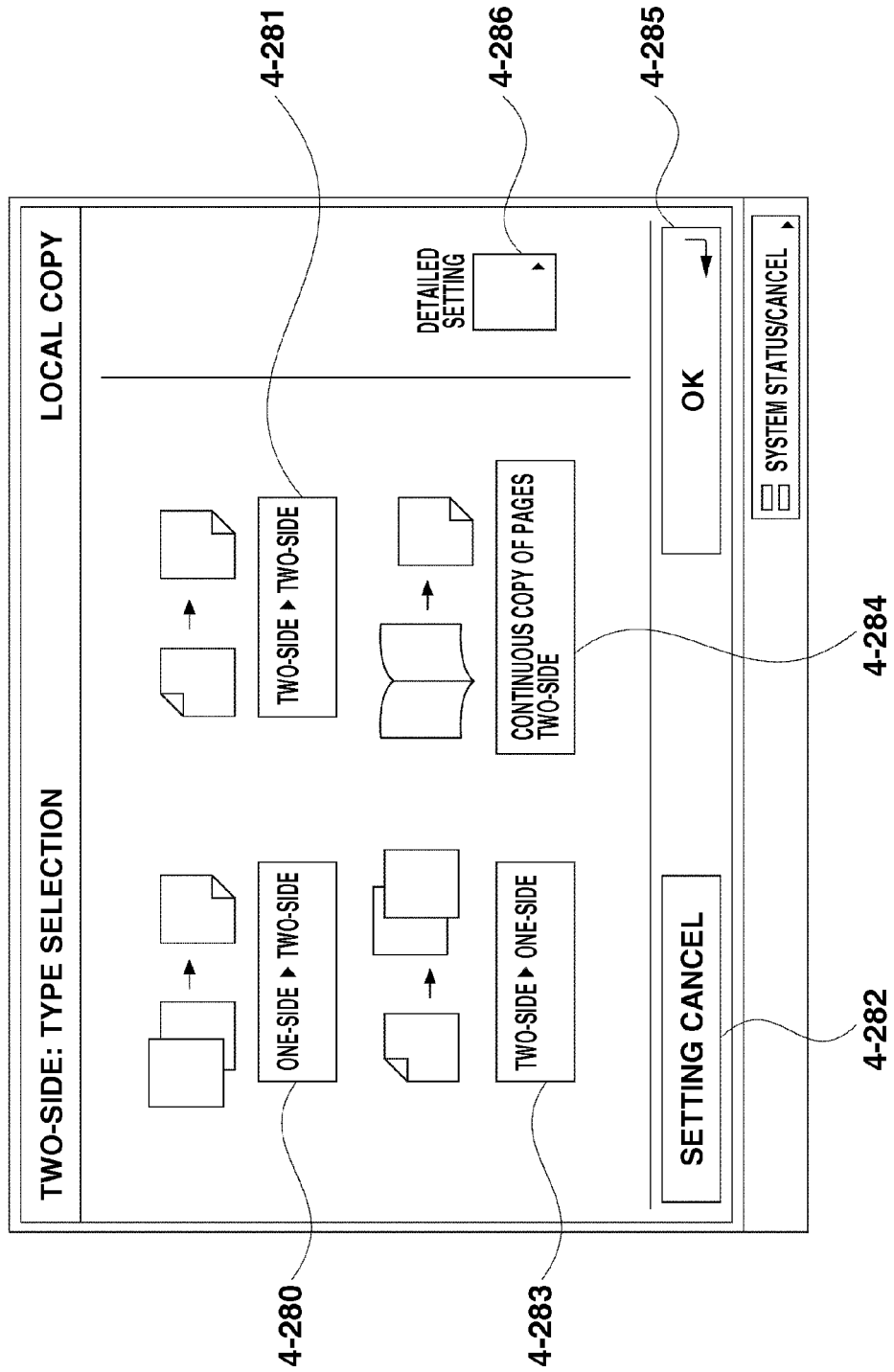

In FIG. 5C, a key 4-280 is a setting key for performing print processing in two sides of a sheet by using a document having an image printed only in its one side (one-sided document hereinafter). A key 4-281 is a setting key for performing print processing in two sides of a sheet by using a document having images printed in its two sides (two-sided document hereinafter). A key 4-283 is a setting key for performing print processing only in one side of a sheet by using a two-sided document. A key 4-284 is a setting key for performing continuous copying of pages in two sides.

A key 4-285 is used for validating setting performed by the operator in the two-sided print setting screen illustrated in FIG. 5C. When this key is pressed, the CPU 200 validates the setting of the two-sided print setting screen illustrated in FIG. 5C, and returns the displaying of the liquid crystal display unit 4-250 to the screen illustrated in FIG. 4.

A key 4-282 is used for canceling the setting performed in FIG. 5C. When the key is pressed, the CPU 200 invalidates the setting of the two-sided print setting screen illustrated in FIG. 5C, and returns the displaying of the liquid crystal display unit 4-250 to the screen illustrated in FIG. 4.

A key 4-286 is used for enabling execution of detailed setting by the user. When the user presses the key 4-286, the CPU 200 displays a screen illustrated in FIG. 5D on the liquid crystal display unit 4-250. Hereinafter, referring to FIG. 5D, detailed setting of two-sided printing will be described.

In FIG. 5D, a key 4-290 is a setting key for making a sheet S processed by the image reading apparatus 100 a left-right open print product. A key 4-291 is a setting key for making the sheet S an upper-lower open print product. When a type of a two-sided print is selected by the key 4-291 or a close key 4-292, and the key 4-292 is pressed, the CPU 200 closes this screen, and returns the displaying of the liquid crystal display unit 4-250 to the screen of FIG. 5C.

As described above, two-sided printing can be set by the two-sided print setting screen illustrated in FIG. 5C and the two-sided print detailed setting screen illustrated in FIG. 5D.

A key 4-256 on the display screen illustrated in FIG. 4 is a sorter key used by the operator for instructing sort processing. When detecting operator's pressing of the key 4-256, the CPU 200 determines that a sort processing mode has been set as copy setting.

Figure 6A:
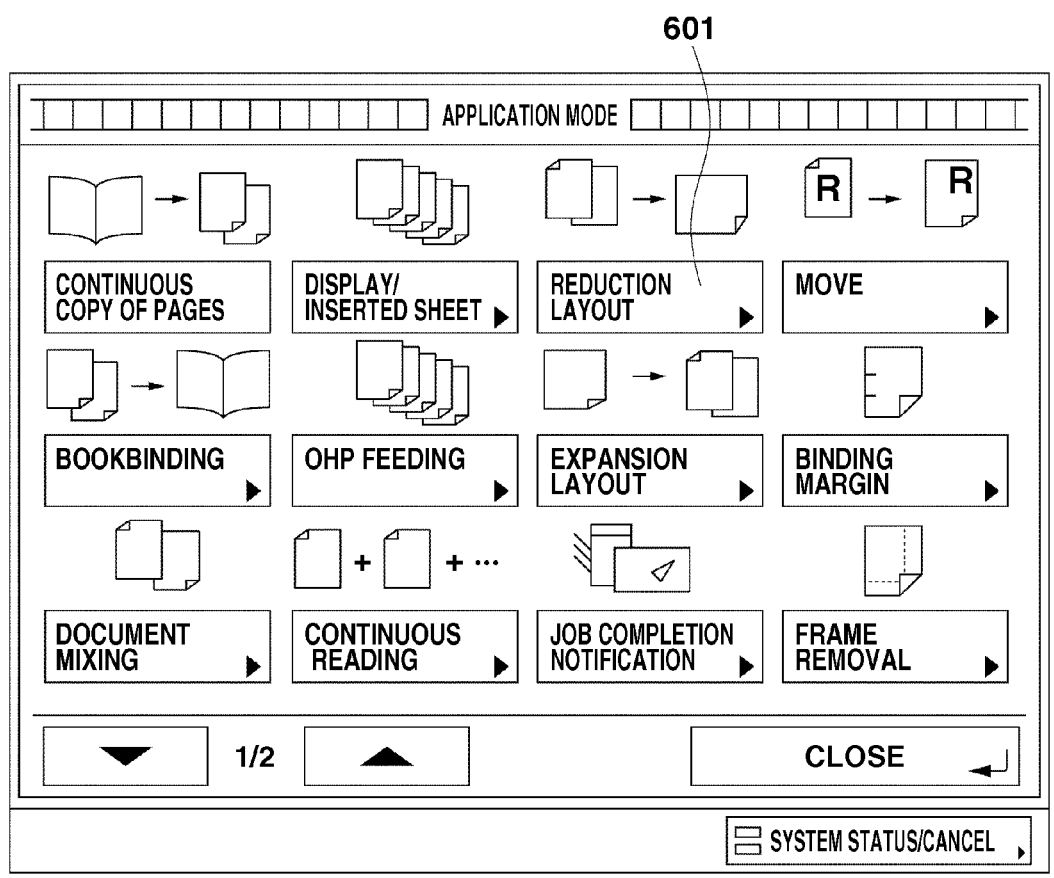
FIGS. 6A and 6B each illustrate a screen displayed on the operation unit.

FIG. 6A illustrates an application mode screen displayed on the display unit 4-250 by the CPU 200 according to the operator's pressing of a key 4-260 on the operation screen illustrated in FIG. 4. When detecting the operator's pressing of a reduction layout key 601 on the application mode screen illustrated in FIG. 6A, the CPU 200 displays a reduction layout setting screen illustrated in FIG. 6B on the display unit 4-250.

Figure 6B:
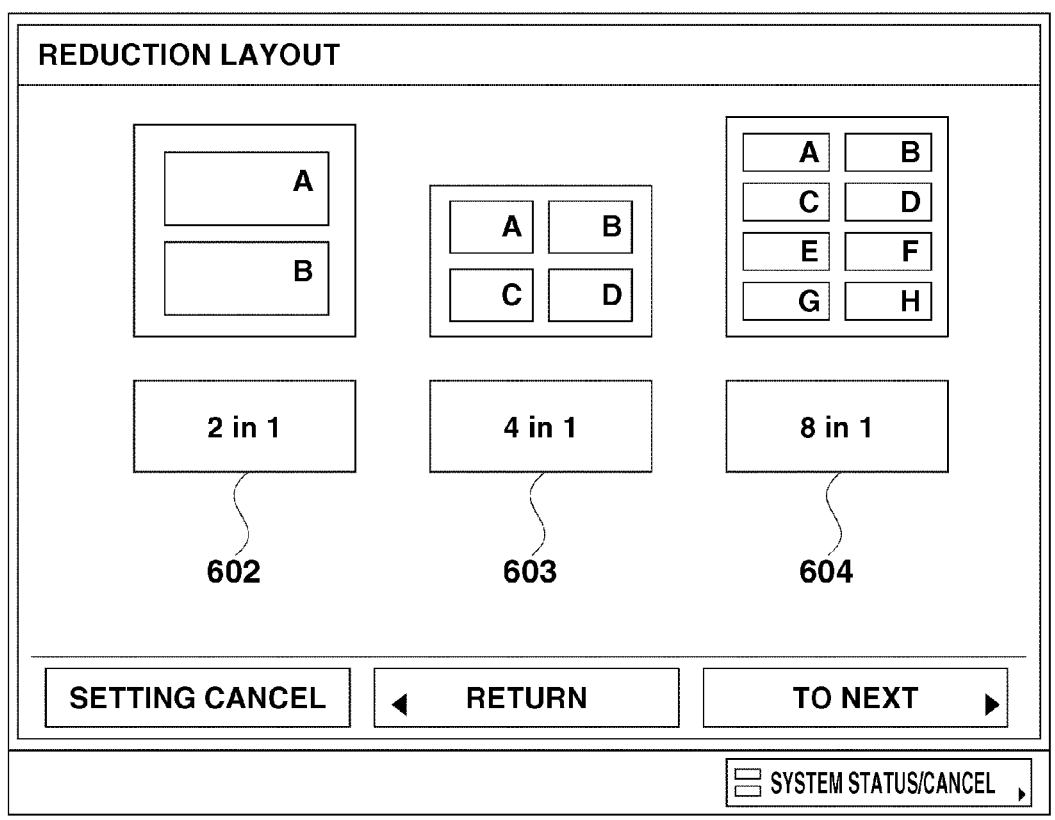

FIG. 6B illustrates a reduction layout setting screen. When detecting the operator's pressing of a key 602, the CPU 200 determines that 2 in 1 has been set as reduction layout processing. When detecting the operator's pressing of a key 603, the CPU 200 determines that 4 in 1 has been set as reduction layout processing. When detecting the operator's pressing of a key 604, the CPU 200 determines that 8 in 1 has been set as reduction layout processing.

More specifically, when detecting pressing of the key 602, 603 or 604, the CPU 200 determines that the layout processing mode has been set as a processing mode.

Next, referring to a flowchart illustrated in FIG. 3, processing performed by the image reading apparatus 100 will be described.

Figure 3:
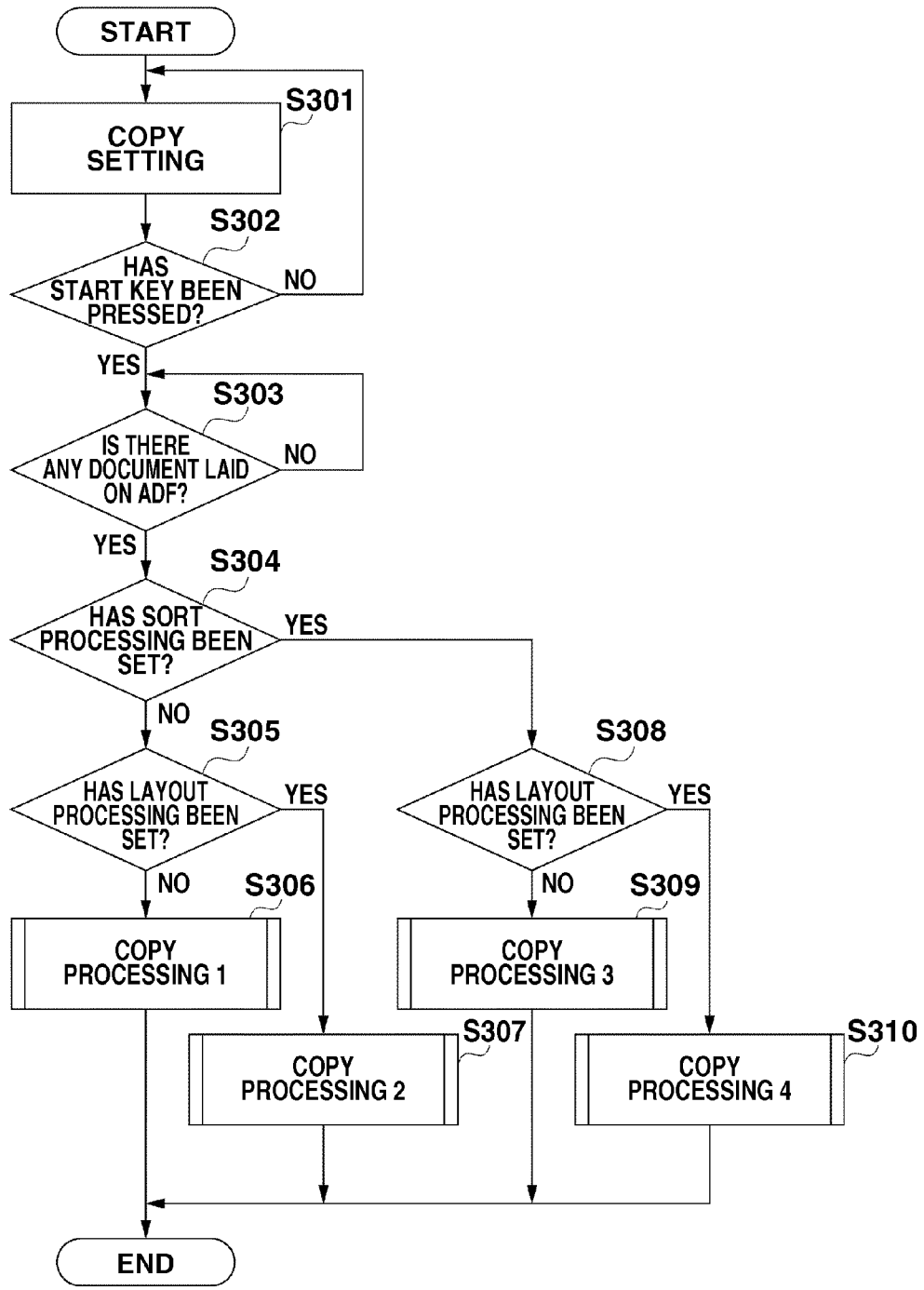
FIG. 3 is a flowchart illustrating processing performed by the image reading apparatus.

FIG. 3 is a flowchart illustrating the processing performed by the image reading apparatus 100. Each processing in the flowchart illustrated in FIG. 3 is performed by executing a program stored in the ROM 206 by the CPU 200.

In step S301, before execution of copy processing, the CPU 200 receives setting (copy setting) of processing conditions in copy setting. Specifically, the CPU 200 performs copy setting based on an instruction input from the operator of the image reading apparatus 100 via the operation unit 140. The copy setting includes various settings such as setting of sort processing and setting of the reduction layout processing illustrated in FIGS. 4 to 6.

In step S302, the CPU 200 determines whether the start key 4-241 has been pressed to instruct a start of copy processing. If the start of copy processing is determined to have been instructed (YES in step S302), the processing proceeds to step S303.

In step S303, the CPU 200 determines whether there is any document laid on the ADF based on an output of a sensor (not illustrated). If a document is determined to have been laid (YES in step S303), the processing proceeds to step S304.

In step S304, the CPU 200 determines whether sort processing has been set in the copy setting set in step S301. If the CPU 200 determines that the sort processing has been set (YES in step S304), the processing proceeds to step S308. If the CPU 200 determines that no sort processing has been set (NO in step S304), the processing proceeds to step S305.

In step S305, the CPU 200 determines whether layout processing has been set in the copy processing set in step S301. If the CPU 200 determines that the layout processing has been set (YES in step S305), the processing proceeds to step S307. If the CPU 200 determines that no layout processing has been set (NO in step S305), the processing proceeds to step S306.

In step S308, the CPU 200 determines whether layout processing has been set in the copy setting set in step S301. If the CPU 200 determines that the layout processing has been set (YES in step S308), the processing proceeds to step S310. If the CPU 200 determines that no layout processing has been set (NO in step S308), the processing proceeds to step S309.

The CPU 200 performs copy processing 1 in step S306, copy processing 2 in step S307, copy processing 3 in step S309, and copy processing 4 in step S310.

Referring to FIGS. 7 to 10, the copy processing 1, the copy processing 2, the copy processing 3, and the copy processing 4 will be described. Each processing illustrated in FIGS. 7 to 10 is, as in the case of each processing illustrated in FIG. 3, performed by executing the program stored in the ROM 206 by the CPU 200.

Figure 7:
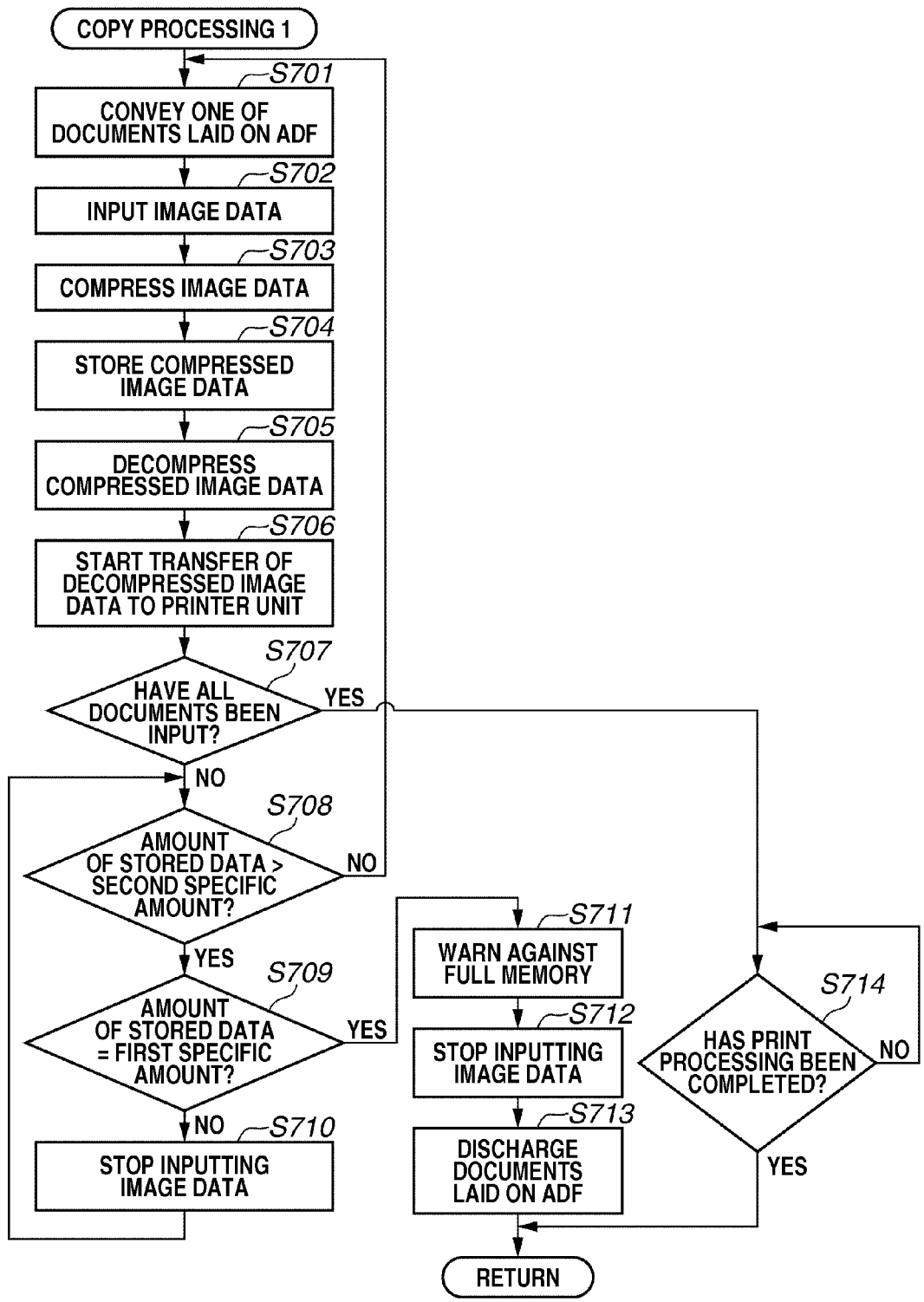
FIG. 7 is a flowchart illustrating copy processing 1.

FIG. 7 is a flowchart illustrating the processing (copy processing 1) of step S306 in FIG. 3. The copy processing 1 in FIG. 7 is performed when neither sort processing nor layout processing has been set in the copy setting performed in step S301 in FIG. 3.

Figure 11:
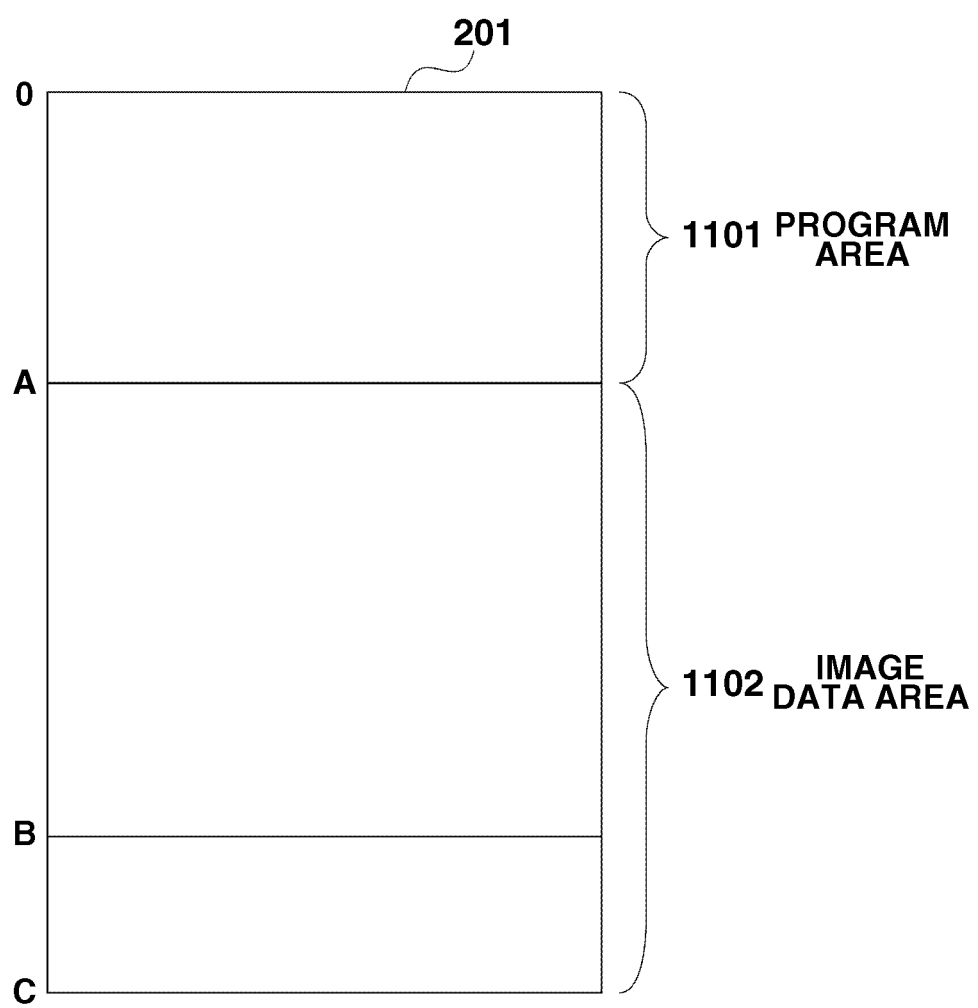
FIG. 11 illustrates a storage area in a RAM 201.

FIG. 11 illustrates a storage area of the RAM 201 for the copy processing 1. The storage area of the RAM 201 includes a program area 1101 used as a work area for executing the program stored in the ROM 206 by the CPU 200. The storage area of the RAM 201 includes an image data area 1102 for storing image data input from the scanner unit 10 and compressed by the CPU 200.

FIG. 11 illustrates addressees 0, A, B, and C. The image data is started to be stored at the address A, and reaches the address B and the address C as an amount of the stored image data increases. A state where the image data is stored at the address C is a memory full state.

In step S701, the CPU 200 conveys one of a plurality of documents laid on the ADF 146 to the document positioning glass 101 by rotating a document feeding roller (not illustrated).

In step S702, the CPU 200 controls the scanner unit 10 (input unit) so as to read the document conveyed on the document positioning glass 101 as image data via the scanner unit I/F 204. The scanner unit 10 inputs an image on the document as image data. An image on one document is input as image data of one page. More specifically, the image data is input on a page-by-page basis.

In step S703, the CPU 200 compresses the image data input from the scanner unit 10. In step S704, the CPU 200 stores the compressed image data in the image data area 1102 of the RAM 201. In step S705, the CPU 200 reads the compressed image data from the RAM 201 to decompress the image data, and starts transferring the decompressed image data to the printer unit 20.

The CPU 200 confirms that the printer unit 20 has normally printed the image data that has started to be transferred to the printer unit 20, and then erases the image data. The erasure may be performed by overwriting the image data stored area of the image data area 1102 with other data. Management information for managing image data may be erased without overwriting with any other data to inhibit normal reading of the image data from the RAM 201.

In step S707, the CPU 200 determines whether all documents laid on the ADF 146 have been input. If all the documents have been input (YES in step S707), the processing proceeds to step S714. If not input (NO in step S707), the processing proceeds to step S708. This determination is performed by monitoring whether a document detection sensor (not illustrated) disposed in the ADF 146 has detected placing of at least one document.

In step S708, the CPU 200 determines whether an amount of image data stored in the image data area 1102 of the RAM 201 is larger than a second specific amount. If the amount is determined to be lager than the second specific amount (YES in step S708), the processing proceeds to step S709. If not (NO in step S708), the processing returns to step S701.

The second specific amount corresponds to an amount of the stored data in a state where the storage address of the image data started to be stored at the address A illustrated in FIG. 11 has reached the address B. More specifically, when an address for storing the image data goes beyond the address B, the amount of the stored image data is determined to be larger than the second specific amount.

In step S709, the CPU 200 determines whether the amount of the image data stored in the image data area 1102 of the RAM 201 is equal to a first specific amount. If the amount is determined to be equal to the first specific amount (YES in step S709), the processing proceeds to step S711. If not (NO in step S709), the processing proceeds to step S710.

The first specific amount corresponds to an amount of the stored data in a state where the storage address of the image data started to be stored at the address A illustrated in FIG. 11 has reached the address C. More specifically, when an address for storing the image data is the address C, the amount of the stored image data is determined to be equal to the first specific amount.

If the amount of the stored image data is determined not to be equal to the first specific amount (NO in step S709), in step S710, the CPU 200 controls the scanner unit I/F 204 to stop inputting the image data by the scanner unit 10. The scanner unit I/F 204 that has received the stop instruction from the CPU 200 stops inputting the image data (reading the document) by the scanner unit 10.

Before the amount of the stored image data becomes equal to the first specific amount (memory full state) in step S710, the scanner unit I/F 204 can stop inputting the image data at a break of each document when a plurality of documents is continuously read.

A difference between the first specific amount and the second specific amount is larger than a capacity used for storing image data (after compression) of one page. By setting the first specific amount and the second specific amount in this manner, when image data of a specific page is input in step S702, the image data of the specific page is stored at least in the RAM 201.

More specifically, if the amount of the stored image data is smaller than the second specific amount before data of a given page is input, the amount of the stored data never reaches the first specific amount after data of a page (specific page) subsequent to the given page is input. Thus, in step S710, the scanner unit I/F 204 can surely stop inputting the image data.

After step S710, the processing proceeds to step S708. When the print processing based on the image data started to be transferred to the printer unit 20 in step S706 is completed, the image data stored in the image data area 1102 is erased because of the completion of the print processing.

If, because of the erasure of the image data, the amount of the image data stored in the image data area 1102 is determined not to be larger (determined to be smaller) than the second specific amount (NO in step S708), the processing proceeds to step S701. More specifically, in step S702, the inputting of the image data stopped in step S710 is resumed.

In step S711, since the amount of the image data stored in the image data area 1102 is equal to the first specific amount, the CPU 200 causes the operation unit 140 to display the memory full state, thereby giving a warning to the operator.

In step S712, the CPU 200 controls the scanner unit I/F 204 to stop inputting the image data by the scanner unit 10. The scanner unit I/F 204 that has received the stop instruction from the CPU 200 stops inputting the image data (reading the document) by the scanner unit 10.

In step S713, the CPU 200 controls the scanner unit 10 to discharge the documents laid on the ADF 146, and terminates the processing of the flowchart illustrated in FIG. 7.

In step S714, since all the documents have been input, the CPU 200 determines whether the print processing based on the image data stored in the image data area 1102 has been completed at the printer unit 20. If the print processing is determined to have been completed (YES in step S714), the processing of the flowchart illustrated in FIG. 7 is terminated.

Benefits of stopping inputting the image data in step S710 are as follows. The ADF 146 cannot stop reading the documents during reading of one document after conveying of the documents is started in step S701.

The ADF 146 thus configured has the following situation. When a memory full state occurs during reading of one document, image data input after the memory has become full is not stored in the RAM 201.

In this case, in order to normally read the document, the document is to be laid again on the ADF 146 to resume the reading. However, the user of the image reading apparatus 100 is to carry out work of laying a document that has not been normally read again on the ADF 146, and hence operability of the apparatus is lost.

If the ADF can stop reading the documents during reading of one document, the above-mentioned situation does not occur. However, this configuration of the ADF uses a mechanism for conveying a document in a direction reverse to a normal conveying direction from a reading stopped state, and reading the document again from a document reading stopped position. The installation of such a mechanism in the image reading apparatus 100 increases its costs.

With the configuration of the present exemplary embodiment, even if the ADF 146 cannot stop reading the documents during reading of one document, operability of the apparatus is never deteriorated.

Figure 8:
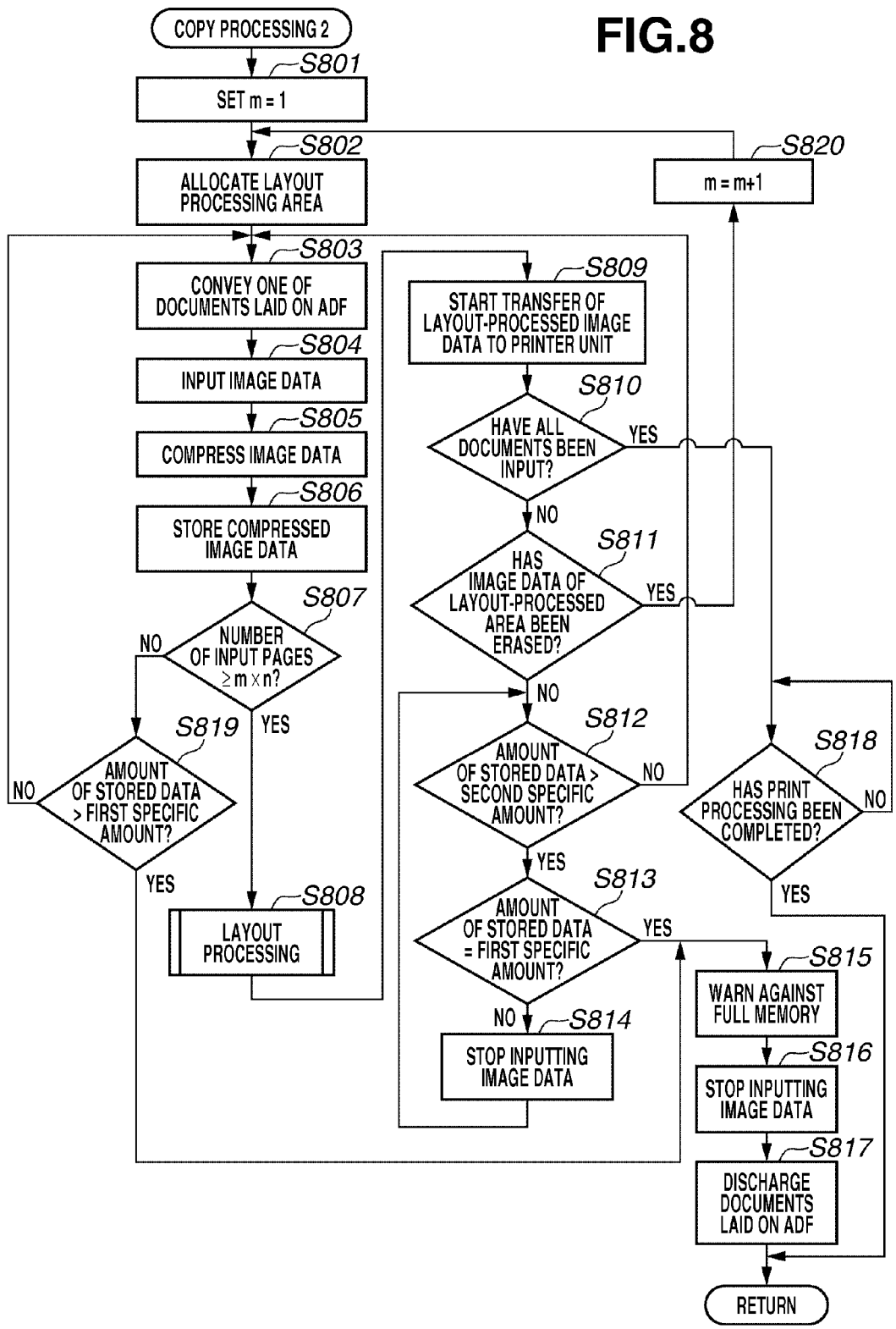
FIG. 8 is a flowchart illustrating copy processing 2.

FIG. 8 is a flowchart illustrating processing (copy processing 2) performed in step S307 illustrated in FIG. 3.

The copy processing illustrated in FIG. 8 is performed when not sort processing but layout processing is set in the copy setting in step S301 illustrated in FIG. 3.

Figure 12:
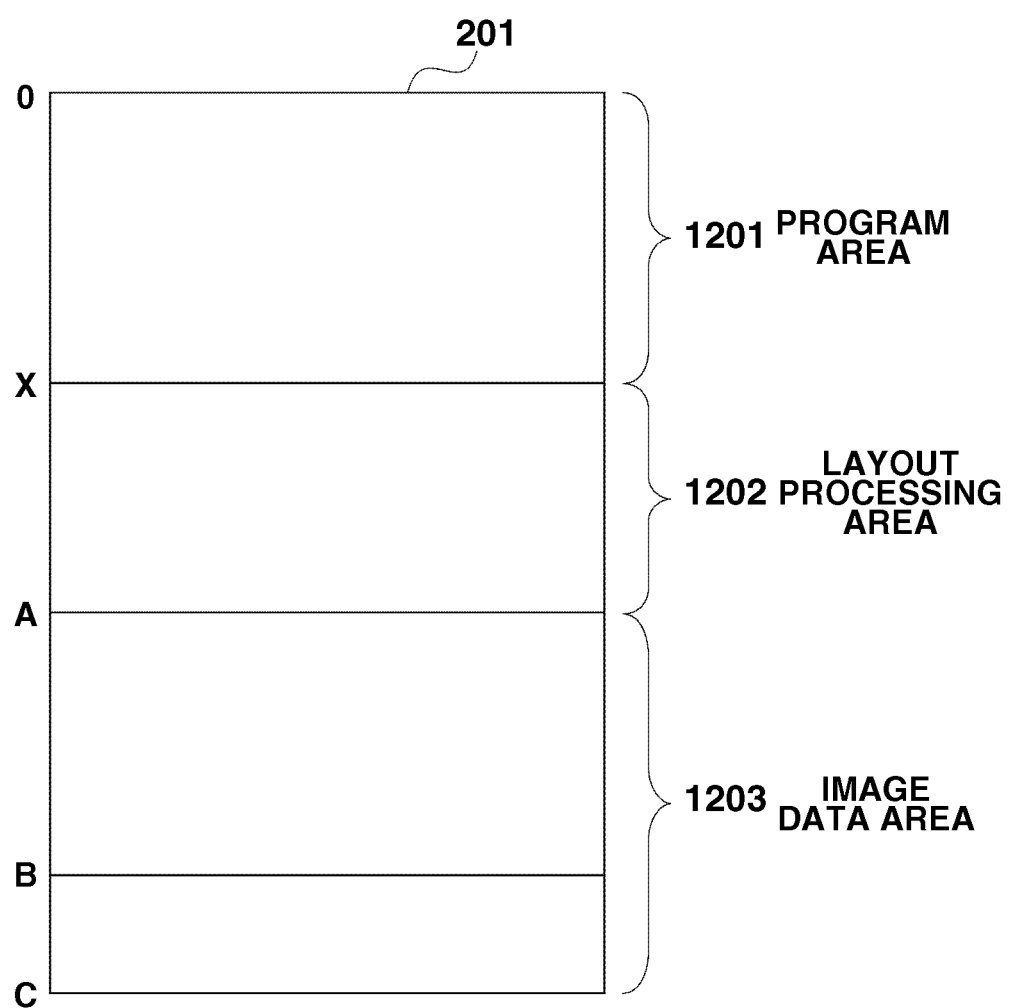
FIG. 12 illustrates a storage area in the RAM 201.

FIG. 12 illustrates a storage area of the RAM 201 for the copy processing 2. The storage area of the RAM 201 includes a program area 1201 used as a work area for executing the program stored in the ROM 206 by the CPU 200. The storage area of the RAM 201 includes a layout processing area 1202 used as a work area for performing reduction layout processing by using a plurality of image data. The storage area of the RAM 201 includes an image data area 1203 for storing image data input from the scanner unit 10 and compressed by the CPU 200.

FIG. 12 illustrates addresses 0, A, B, C, and X. Image data is started to be stored at the address A, and reaches the address B and the address C as an amount of the stored image data increases. A state where the image data is stored at the address C is a memory full state.

In step S801, the CPU 200 sets "1" in a constant m. This constant m indicates a number of times of reading a document of N pages when layout processing for reduction layout with N in 1 (N is 2, 4, or 8 in the present exemplary embodiment) is performed. With N=2, m=1 is set when data of first and second pages are read, and m=2 is set when data of third and fourth pages are read.

In step S802, the CPU 200 allocates a layout processing area 1202 in the RAM 201. The layout processing area has a size varied according to a type of reduction layout (2 in 1, 4 in 1, or 8 in 1) set in the layout processing.

Specifically, with 2 in 1, the layout processing area has a size enough to store uncompressed image data (RAW image data) of two pages. With 4 in 1, the layout processing area has a size enough to store uncompressed image data (RAW image data) of four pages. With 8 in 1, the layout processing area has a size enough to store uncompressed image data (RAW image data) of eight pages.

A capacity of the RAM 201 is a fixed size. Hence, when a size of an area allocated to the layout processing area increases, a size of an area allocated to the image data area 1203 is reduced by a corresponding amount.

In step S803, the CPU 200 conveys one of a plurality of documents laid on the ADF 146 to the document positioning glass 101 by rotating the document feeding roller (not illustrated).

In step S804, the CPU 200 controls the scanner unit 10 (input unit) via the scanner unit I/F 204 to read the document conveyed on the document positioning glass 101 as image data. The scanner unit 10 inputs an image of the document as image data. The image of one document is input as image data of one page. More specifically, image data is input on a page-by-page basis.

In step S805, the CPU 200 compresses the image data input from the scanner unit 10. In step S806, the CPU 200 stores the compressed image data in the image data area 1102 of the RAM 201.

In step S807, the CPU 200 determines whether a number of input pages has reached m×N. If the number of input pages is determined to have reached m×N (YES in step S807), the processing proceeds to step S808. If not (NO in step S807), the processing proceeds to step S819.

If the number of input pages is not m×N (NO in step S807), in step S819, the CPU 200 determines whether an amount of the image data stored in the image data area 1203 of the RAM 201 is equal to the first specific amount. If the amount of the stored imaged data is determined to be equal to the first specific amount (YES in step S819), the processing proceeds to step S815. If not (NO in step S819), the processing proceeds to step S803.

The first specific amount corresponds to an amount of the stored data in a state where the storage address of the image data started to be stored at the address A illustrated in FIG. 12 has reached the address C. More specifically, when an address for storing the image data is the address C, the amount of the stored image data is determined to be equal to the first specific amount.

If the number of input pages is m×N (YES in step S807), in step S808, the CPU 200 performs layout processing, and reduces image data of N pages to generate image data to be printed on one sheet. The layout processing will be described in detail below referring to FIG. 13.

In step S809, the CPU 200 starts transferring the image data subjected to the layout processing in step S808 from the RAM 201 to the printer unit 20.

The CPU 200 confirms that the printer unit 20 has normally printed the image data that has started to be transferred to the printer unit 20, and then erases the image data stored in the layout processing area 1202.

The image data may be erased by overwriting the area where the image data has been stored in the image data area 1203 with other data. In place of overwriting with other data, management information for managing the image data may be erased to inhibit normal reading of the image data from the RAM 201.

In step S810, the CPU 200 determines whether all the documents laid on the ADF 146 have been input. If input (YES in step S810), the processing proceeds to step S818. If not input (NO in step S810), the processing proceeds to step S811. This determination is performed by monitoring whether the document detection sensor (not illustrated) disposed in the ADF 146 detects placing of at least one document.

In step S811, the CPU 200 determines whether the image data stored in the layout processing area 1202 has been erased. If the image data is determined to have been erased (YES in step S811), in step S820, the CPU 200 increments the constant m, and the processing proceeds to step S802.

If the image data is determined not to have been erased (NO in step S811), in step S812, the CPU 200 determines whether the amount of the image data stored in the image data area 1203 of the RAN 201 is larger than the second specific amount. If the amount of the stored image data is determined to be larger than the second specific amount (YES in step S812), the processing proceeds to step S813. If not (NO in step S812), the processing returns to step S803. By returning to step S803, the inputting of the image data is continued.

The second specific amount corresponds to an amount of stored data in a state where the storage address of the image data started to be stored at the address A illustrated in FIG. 12 has reached the address B. More specifically, when the address for storing the image data goes beyond the address B, the amount of the stored image data is determined to be larger than the second specific amount.

A difference between the first specific amount and the second specific amount is larger than a capacity used for image data (after compression) of one page. By setting the first specific amount and the second specific amount in this manner, when image data of a specific page is input in step S804, the image data of the specific page is stored at least in the RAM 201.

More specifically, if the amount of the stored image data is smaller than the second specific amount before data of a given page is input, the amount of the stored data never reaches the first specific amount after data of a page (specific page) subsequent to the given page is input. Thus, in step S814, the inputting of the image data can be surely stopped.

The first specific amount in the copy processing 2 is smaller than the first specific amount in the copy processing 1 by an amount equal to the layout processing area 1202. The second specific amount in the copy processing 2 is smaller than the second specific amount in the copy processing 1 by an amount equal to the layout processing area 1202. However, there is no difference in capacity of the program area 1201 between the copy processing 1 and the copy processing 2.

In step S813, the CPU 200 determines whether the amount of the image data stored in the image data area 1203 of the RAM 201 is equal to the first specific amount. If the amount of the stored image data is determined to be equal to the first specific amount (YES in step S813), the processing proceeds to step S815. If not (NO in step S813), the processing proceeds to step S814.

If the amount of the stored image data is determined not to be equal to the first specific amount (NO in step S813), in step S814, the CPU 200 controls the scanner unit I/F 204 to stop inputting the image data by the scanner unit 10. The scanner unit I/F 204 that has received the stop instruction from the CPU 200 stops inputting the image data (reading the document) by the scanner unit 10.

Before a state (memory full state) where the amount of the stored image data becomes equal to the first specific amount occurs, the inputting of the image data can be stopped at a break of each document during continuous reading of a plurality of documents.

After step S814, the processing proceeds to step S812. When the print processing based on the image data started to be transferred to the printer unit 20 in step S809 is terminated, the image data stored in the image data area 1203 is erased because of the completion of the print processing.

If the amount of the image data stored in the image data area 1203 is determined not to be larger (the amount is smaller) than the second specific amount because of the erasure of the image data (NO in step S812), the processing proceeds to step S803. More specifically, in step S804, the inputting of the image data stopped in step S814 is resumed.

In step S815, since the amount of the image data stored in the image data area 1203 is equal to the first specific amount, the CPU 200 causes the operation unit 140 to display the memory full state, thereby giving a warning to the operator.

In step S816, the CPU 200 controls the scanner unit I/F 204 to stop inputting the image data by the scanner unit 10. The scanner unit I/F 204 that has received the stop instruction from the CPU 200 stops inputting the image data (reading the document) by the scanner unit 10.

In step S817, the CPU 200 controls the scanner unit 10 to discharge the documents laid on the ADF 146, and terminates the processing of the flowchart of FIG. 8.

In step S818, since all the documents have been input, the CPU 200 determines whether the print processing based on the image data stored in the image data area 1203 has been completed at the printer unit 20. If the print processing is determined to have been completed (YES in step S818), the processing of the flowchart illustrated in FIG. 8 is terminated.

Next, referring to FIG. 13, the layout processing of step S808 will be described in detail. FIG. 13 is a flowchart illustrating the layout processing.

In step S1301, the CPU 200 decompresses the image data of the N pages stored in the image data area 1203 to generate RAW image data of N pages. In step S1302, the CPU 200 stores the RAW image data of the N pages in the layout processing area 1202. In step S1303, the CPU 200 erases the image data decompressed in step S1301 from the image data area 1203.

In step S1304, the CPU 200 reduces and/or rotates the image data of the N pages stored in the layout processing area 1202. In step S1305, the CPU 200 lays out the processed image data to generate image data of one page. In step S1306, the CPU 200 compresses the image data generated in step S1305. In step S1307, the CPU 200 stores the compressed image data in the image data area 1203 of the RAM 201.

In step S1308, the CPU 200 erases the image data generated in step S1305 from the layout processing area 1202 to terminate the layout processing in FIG. 13.

Benefits of stopping inputting the image data in step S814 illustrated in FIG. 8 are similar to those of stopping inputting the image data in step S710 of the copy processing 1.

A feature of the copy processing 2 is appropriate switching between the following two operations according to before/after a number of input pages reaches N pages when N-in-1 layout processing is performed.

(1) Before Number of Input Pages Reaches N Pages

Different from the copy processing 1, the inputting of the image data is not stopped until data of N pages is input unless a memory full state is set.

(2) After Number of Input Pages Reaches N Pages

As in the case of the copy processing 1, the inputting of the image data is stopped at a break of each of the plurality of documents, and resumed after print processing of one sheet (laying out N pages) is completed.

In the case of (1), if an operation is similar to that of the copy processing 1 even before the image data of N pages is stored in the RAM 201, there is a possibility that an amount of stored data may become larger than the second specific amount before the image data of the N pages is input, consequently stopping the inputting of the image data. In the case of N-in-1 layout processing, no layout processing is performed unless the image data of the N pages is input, and hence the processing becomes an error in a state where no print processing is performed even for one sheet.

In the copy processing 2, in the case of (1), the inputting of the image data is not stopped until the image data of the N pages is input unless a memory full state occurs. In this case, there is also a possibility that the memory full state may occur before the image data of the N pages is input. However, as compared with the case of the operation similar to the copy processing 1, a probability that the processing will become an error in a state of performing no print processing even for one sheet can be reduced.

Figure 9:
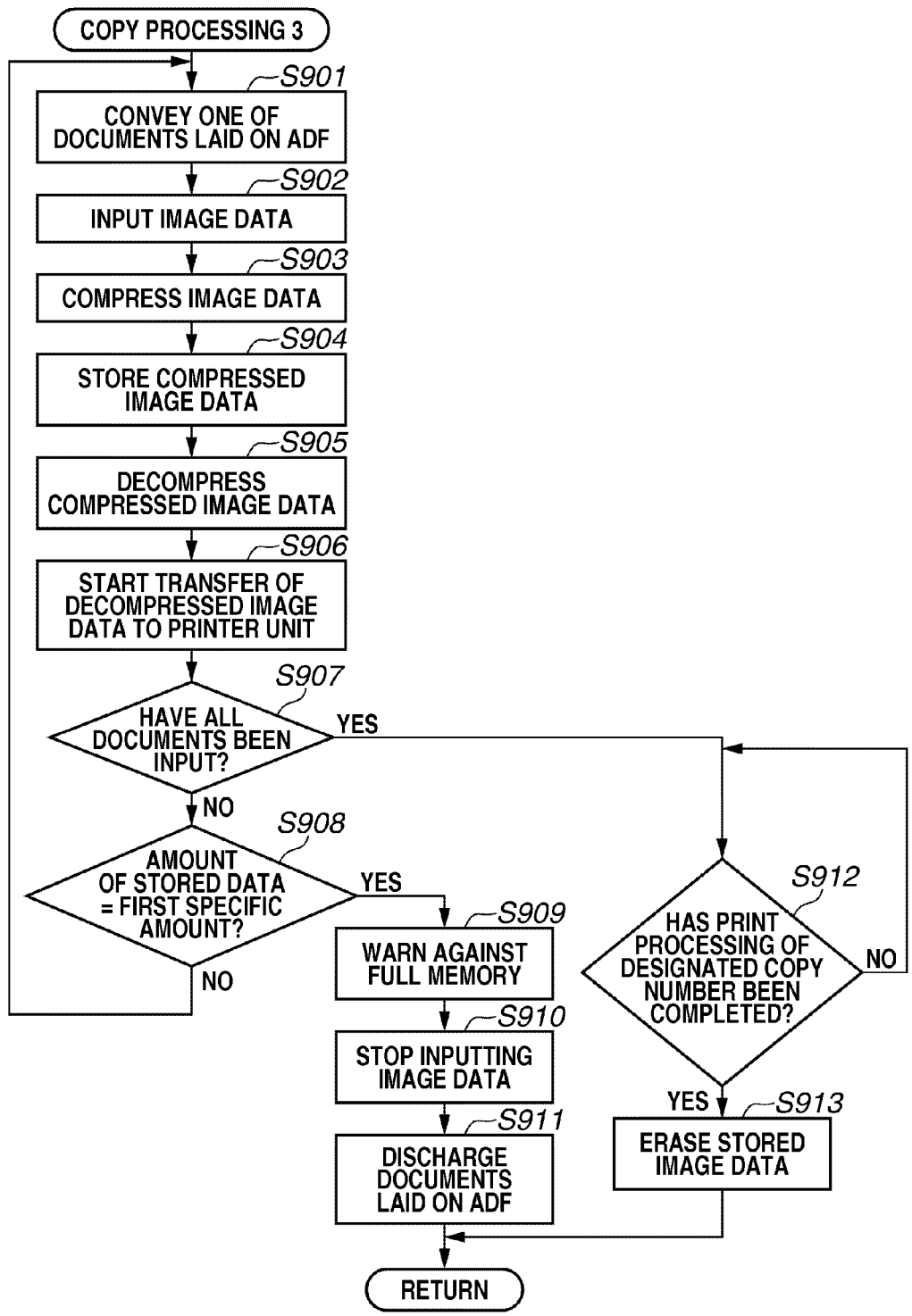
FIG. 9 is a flowchart illustrating copy processing 3.

FIG. 9 is a flowchart illustrating the processing (copy processing 3) in step S309 illustrated in FIG. 3. The copy processing 3 illustrated in FIG. 9 is performed when no layout processing is set while sort processing is set in the copy setting in S301 illustrated in FIG. 3.

A storage area of the RAM 201 for the copy processing 3 is as illustrated in FIG. 11. Steps S901 to S906 are similar to steps S701 to S706 of FIG. 7, and thus description thereof is omitted.

In FIG. 7 (copy processing 1), the image data stored in the image data area 1102 is erased after confirmation that the transferred image data has normally been printed at the printer unit 20. The copy processing 3 is different from the copy processing 1 in that the image data is not erased before print processing is completed for a designated number of copies.

In the sort processing, the image data is not erased before print processing is completed for a designated number of copies. The reason is that the sort processing is processing for reading the same image data (image data of N pages in the case of a document of N pages) from the RAM 201 by a plurality of times to generate a plurality of copies of a print product with the N pages set as one copy.

In step S907, the CPU 200 determines whether all the documents laid on the ADF 146 have been input. If input (YES in step S907), the processing proceeds to step S912. If not input (NO in step S907), the processing proceeds to step S908. This determination is performed by monitoring whether the document detection sensor (not illustrated) disposed in the ADF 146 has detected laying of at least one document.

In step S908, the CPU 200 determines whether the amount of the image data stored in the image data area 1203 of the RAM 201 is equal to the first specific amount. If the amount of the stored image data is determined to be equal to the first specific amount (YES in step S908), the processing proceeds to step S909. If not equal (NO in step S908), the processing proceeds to step S901.

The first specific amount corresponds to the amount of the stored data in a state where the storage address of the image data started to be stored at the address A illustrated in FIG. 11 has reached the address C. More specifically, when an address for storing the image data is the address C, the amount of the stored image data is determined to be equal to the first specific amount.

In step S909, since the amount of the image data stored in the image data area 1203 is equal to the first specific amount, the CPU 200 causes the operation unit 140 to display a memory full state, thereby giving a warning to the operator.

In step S910, the CPU 200 controls the scanner unit I/F 204 to stop inputting the image data by the scanner unit 10. The scanner unit I/F 204 that has received the stop instruction from the CPU 200 stops inputting the image data (reading the document) by the scanner unit 10.

In step S911, the CPU 200 controls the scanner unit 10 to discharge the documents laid on the ADF 146, and terminates the processing of the flowchart illustrated in FIG. 9.

In step S912, the CPU 200 determines whether the print processing for the number of copies (designated number of copies) input by the key group 4-245 illustrated in FIG. 11 has been completed. If the print processing is determined to have been completed (YES in step S912), the processing proceeds to step S913.

In step S913, the CPU 200 determines whether the print processing for the designated number of copies has been completed. If the print processing is determined to have been completed (YES in step S913), the processing illustrated in FIG. 9 is terminated.

In the copy processing 3 illustrated in FIG. 9, different from the copy processing 1, the inputting of the image data is not stopped until data of all the pages (e.g., N pages) of the document is input unless a memory full state occurs. If an operation is similar to that of the copy processing 1 even before the image data of N pages is stored in the RAM 201, there is a possibility that the amount of the stored data may become larger than the second specific amount before the image data of the N pages is input, consequently stopping the inputting of the image data.

In the case of performing sort processing for the image data of the N pages, unless the image data of the N pages is input, no print processing is started. Hence, the processing becomes an error in a state where no print processing is performed even for one sheet. Thus, in the copy processing 3, the inputting of the image data is not stopped until data of all the pages (N pages) of the document is input unless a memory full state occurs.

In this case, there is also a possibility that a memory full state may occur before the data of the N pages is input. However, as compared with the case of performing the operation similar to that of the copy processing 1, a probability that the processing will become an error in a state of performing no print processing even for one sheet can be reduced.

Figure 10:
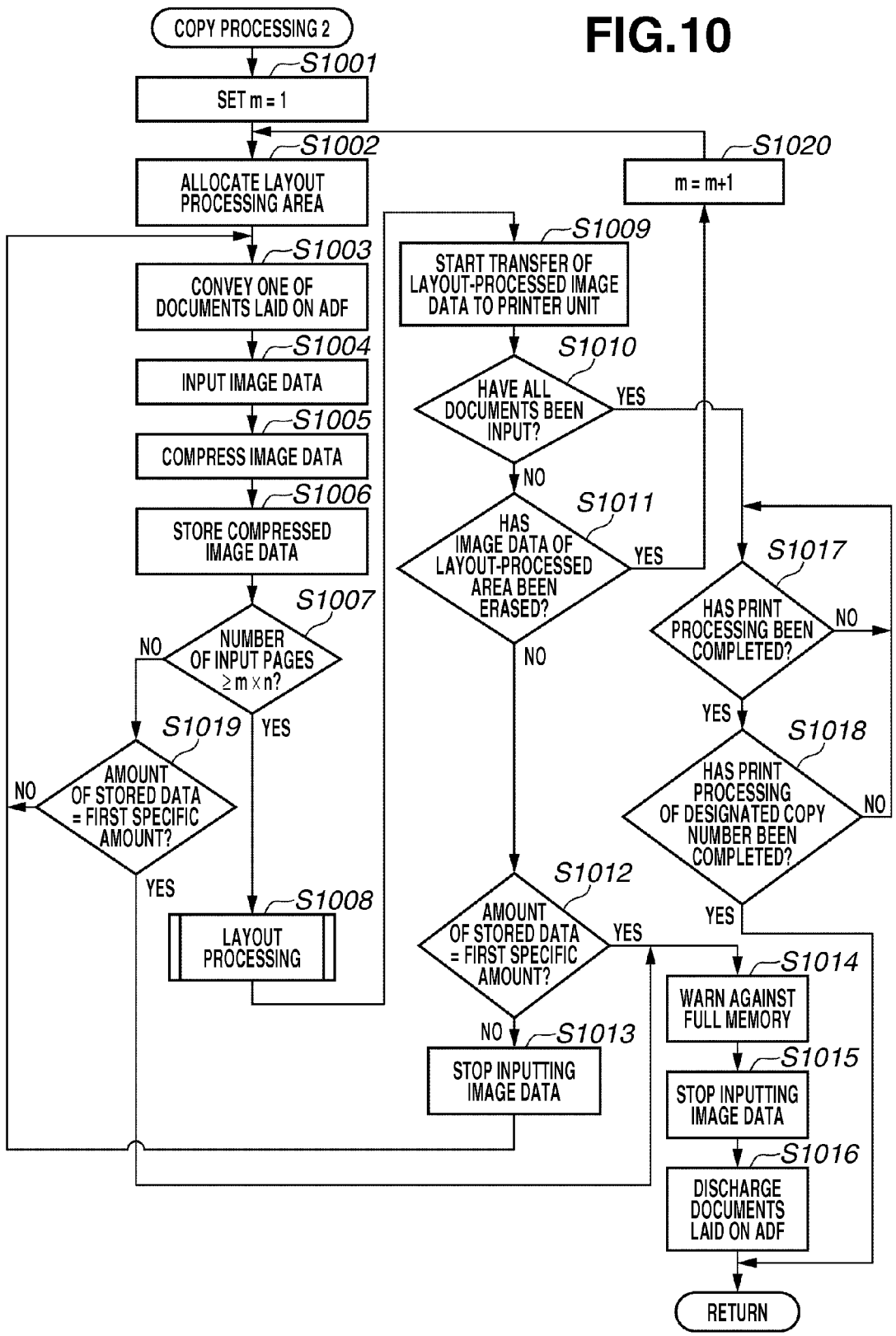
FIG. 10 is a flowchart illustrating copy processing 4.

FIG. 10 is a flowchart illustrating the processing (copy processing 4) in step S310 illustrated in FIG. 3. The copy processing 4 in FIG. 10 is performed when sort processing and layout processing are both set in the copy setting (S301) in FIG. 3. A storage area of the RAM 201 for the copy processing 4 is as illustrated in FIG. 12.

The copy processing 4 in FIG. 10 is a modified example of the copy processing 2 in FIG. 8. Thus, hereinafter, different processing from that in FIG. 8 will be described. Processing other than that described below is similar to that of the copy processing 2.

In the copy processing 2, in step S812, the CPU 200 determines whether the amount of the image data stored in the image data area 1203 is larger than the second specific amount. In the copy processing 4, however, there is no step corresponding to step S812. It is for the purpose of not stopping the inputting of the image data until data of all the pages (e.g., N pages) of the document is input unless a memory full state occurs.

In the copy processing 2, the image data stored in the image data area 1203 is erased after the confirmation that the transferred image data has been normally printed at the printer unit 20. In the copy processing 4, however, the image data is not erased before print processing is completed for a designated number of copies.

In the sort processing, the image data is not erased before print processing is completed for a designated number of copies. The reason is that the sort processing is processing for reading the same image data (image data of N pages in the case of the document of N pages) from the RAM 201 by a plurality of times to generate a plurality of copies of a print product with the N pages set as one copy.

The copy processing 4 is different from the copy processing 2 in that step S1017 is added. In step S1017, the CPU 200 determines whether print processing has been completed for copies (designated number of copies) input by the key group 4-245 illustrated in FIG. 4. If the print processing is determined to have been completed (YES in step S1017), the processing proceeds to step S1018.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-144618 filed Jun. 17, 2009, which is hereby incorporated by reference herein in its entirety.

What is claimed is:

1. An image reading apparatus, comprising:
a reading unit configured to input image data by reading a document, the image data being input on a page-by-page basis;
a storage unit configured to store image data input by the reading unit; a layout processing unit configured to perform layout processing for printing image data of a plurality of pages input by the reading unit on one sheet;
a determining unit configured to determine whether image data of the number of pages required for performing the layout processing has been stored in the storage unit; and
a control unit configured to control the reading unit to read a document until the storage unit reaches a memory full state and to stop the reading of the document in response to the storage unit reaching the memory full state in a case where the determining unit determines that the image data of the number of pages required for performing the layout processing has not been stored in the storage unit, and
to control the reading unit to read a document until a data amount of image data having been stored in the storage unit reaches a predetermined data amount which is smaller than a data amount corresponding to the memory full state and to stop the reading of the document in response to the image data having been stored in the storage unit becoming larger than the predetermined data amount in a case where the image data of the number of pages required for performing the layout processing has been stored in the storage unit.

2. The image reading apparatus according to claim 1, wherein in a case where the determining unit determines that the image data of the number of pages required for performing the layout processing has not been stored in the storage unit, the control unit controls the reading unit to stop the reading of the document in response to the storage unit reaching the memory full state and notifies that the storage unit reaches the memory full state.

3. The image reading apparatus according to claim 2, wherein the control unit displays, on an operation unit, that the storage unit reaches the memory full state.

4. The image reading apparatus according to claim 1, wherein in a case where the determining unit determines that the image data of the number of pages required for performing the layout processing has been stored in the storage unit and the control unit controls the reading unit to stop the reading of the document, the control unit controls the reading unit to read the document in response to the image data having been stored in the storage unit becoming smaller than or equal to the predetermined data amount.

5. The image reading apparatus according to claim 1, further comprising a printing unit configured to perform printing processing on a sheet based on image data on which the layout processing has been performed.

6. An image reading method, comprising:
inputting image data by reading a document by a reading unit, the image data being input on a page-by-page basis;
storing image data input;
performing layout processing for printing image data of a plurality of pages on one sheet;
determining whether image data of the number of pages required for performing the layout processing has been stored in a storage unit; and
controlling the reading unit to read a document until the storing reaches a memory full state and to stop the reading of the document in response to the storing reaching the memory full state in a case where the image data of the number of pages required for performing the layout processing has not been stored in the storage unit, and
controlling the reading unit to read a document until a data amount of image data having been stored reaches a predetermined data amount which is smaller than a data amount corresponding to the memory full state and to stop the reading of the document in response to the image data having been stored becoming larger than the predetermined data amount in a case where the image data of the number of pages required for performing the layout processing has been stored in the storage unit.

7. The image reading method according to claim 6, wherein in a case where the image data of the number of pages required for performing the layout processing has not been stored in the storage unit, the controlling controls the reading unit to stop the reading of the document in response to the storing reaching the memory full state and notifies that the storing reaches the memory full state.

8. The image reading method according to claim 7, wherein the controlling displays, on an operation unit, that the storing reaches the memory full state.

9. The image reading method according to claim 6, wherein in a case where the image data of the number of pages required for performing the layout processing has been stored in the storage unit and the controlling controls the reading unit to stop the reading of the document, the controlling controls the reading unit to read the document in response to the image data having been stored becoming smaller than or equal to the predetermined data amount.

10. The image reading method according to claim 6, further comprising performing printing processing on a sheet based on image data on which the layout processing has been performed.

11. A non-transitory computer readable medium storing a computer-executable program of instructions for causing a computer to perform an image reading method, comprising:
inputting image data by reading a document by a reading unit, the image data being input on a page-by-page basis;
storing image data input;
performing layout processing for printing image data of a plurality of pages on one sheet;
determining whether image data of the number of pages required for performing the layout processing has been stored in a storage unit; and
controlling the reading unit to read a document until the storing reaches a memory full state and to stop the reading of the document in response to the storing reaching the memory full state in a case where the image data of the number of pages required for performing the layout processing has not been stored in the storage unit, and
controlling the reading unit to read a document until a data amount of image data having been stored reaches a predetermined data amount which is smaller than a data amount corresponding to the memory full state and to stop the reading of the document in response to the image data having been stored becoming larger than the predetermined data amount in a case where the image data of the number of pages required for performing the layout processing has been stored in the storage unit.

12. The non-transitory computer readable medium according to claim 11, wherein in a case where the image data of the number of pages required for performing the layout processing has not been stored in the storage unit, the controlling controls the reading unit to stop the reading of the document in response to the storing reaching the memory full state and notifies that the storing reaches the memory full state.

13. The non-transitory computer readable medium according to claim 12, wherein the controlling displays, on an operation unit, that the storing reaches the memory full state.

14. The non-transitory computer readable medium according to claim 11, wherein in a case where the image data of the number of pages required for performing the layout processing has been stored in the storage unit and the controlling controls the reading unit to stop the reading of the document, the controlling controls the reading unit to read the document in response to the image data having been stored becoming smaller than or equal to the predetermined data amount.

15. The non-transitory computer readable medium according to claim 11, further comprising performing printing processing on a sheet based on image data on which the layout processing has been performed.

* * * * *